May 1, 1951 E. C. SULLIVAN 2,551,300
DECANTER HANDLE CONSTRUCTION
Filed March 5, 1948
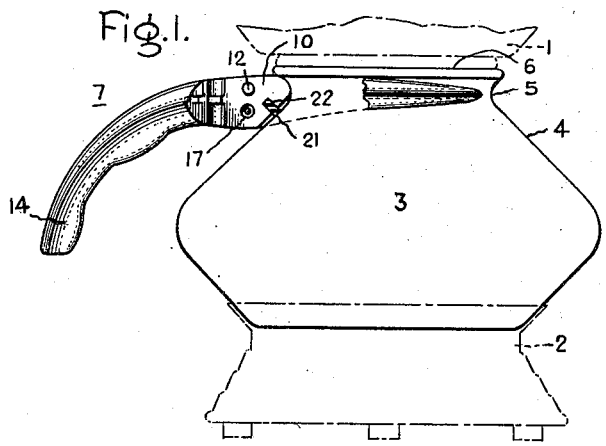
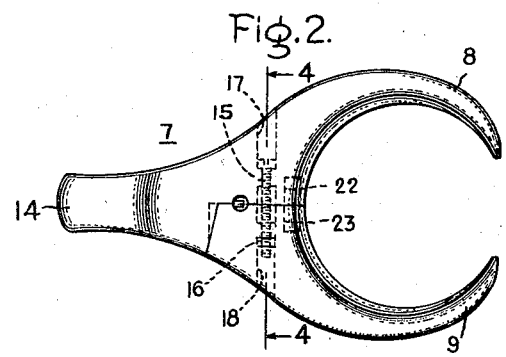
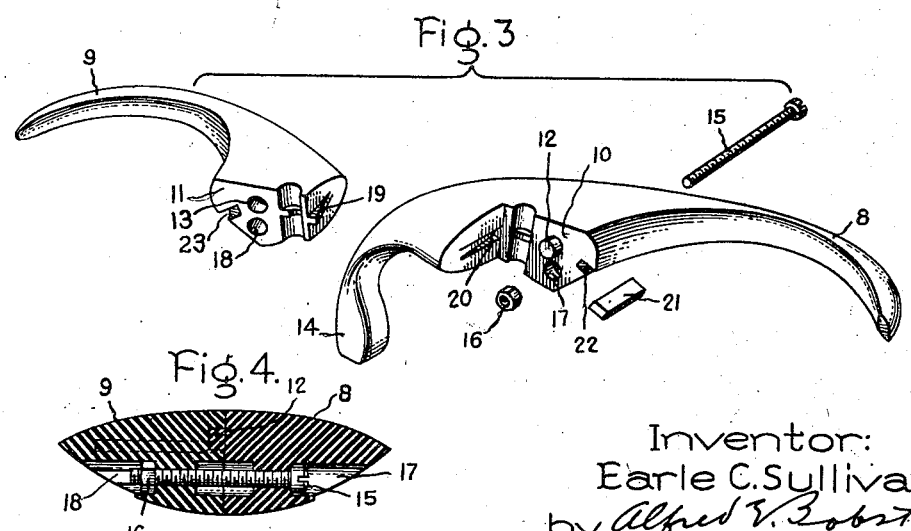
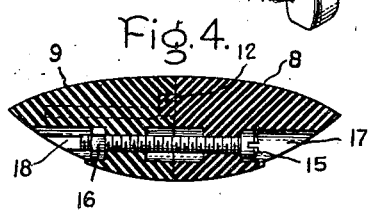
Inventor:
Earle C. Sullivan,
by Alfred V. Bobst.
His Attorney.

Patented May 1, 1951

2,551,300

UNITED STATES PATENT OFFICE 2,551,300

DECANTER HANDLE CONSTRUCTION

Earle C. Sullivan, Bridgeport, Conn., assignor to General Electric Company, a corporation of New York Application March 5, 1948, Serial No. 13,221

4 Claims. (Cl. 294—27)

My invention relates to containers variously called decanters, flasks, or bowls, and especially to those containers made of fragile material. More particularly, my invention relates to handle constructions for such decanters, the handle being separate from the container body. Although this specification will show and describe the invention as applied to a glass bowl and handle of the type widely used for brewing coffee by the vacuum method, it will be obvious that the invention is not limited to coffee makers, or to the precise shape of bowl or handle shown and described, or even to decanters made only of glass or other fragile material.

In removable handle constructions used with glassware, it is often difficult to compensate for manufacturing variations in the dimensions of the container. One object of my invention is to provide a separate or removable handle construction for use with containers of this character which will permit the use of a single size handle which will accommodate itself to fairly wide variations of container dimensions.

Another object of my invention is to design a removable handle which will grip a decanter or bowl positively but gently, thereby preventing looseness of fit as well as possible damage to the container by the handle.

A further object of my invention is to provide a handle design which will not require cleaning as often as prior known designs of removable handles.

A still further object is to provide a container handle construction which is easy to apply to and remove from a container.

Other objects are to make a strong, durable and attractive decanter with detachable handle which is inexpensive and requires but a few simple parts.

The above objects and advantages are obtained by novel formations and parts of the handle, and by their cooperation with parts of the container.

Still other objects and the details of that which I believe to be novel and my invention will be clear from the following description and claims taken with the accompanying drawing in which is illustrated an example of decanter embodying the present invention and incorporating an improved handle construction.

In the drawing, Fig. 1 is a side elevation of an improved decanter and handle according to my invention, certain parts being broken away for clarity; Fig. 2 is a plan view of the assembled handle parts illustrated in Fig. 1; Fig. 3 is an exploded perspective view of the parts of the handle assembly; and Fig. 4 is a sectional view taken on the line 4—4 of Fig. 2 but showing the parts on a larger scale than Fig. 2.

For purposes of illustration, I have shown my invention as applied to the glass decanter or lower bowl of a coffee maker of the vacuum type. The dot-dash lines in Fig. 1 indicate an upper bowl I and a heater 2 which serves to support as well as heat the lower bowl in the usual manner during the coffee brewing operation. The decanter or bowl of the present invention is indicated at 3, and it has a bulging body 4 with a restricted neck portion 5 extending immediately above the body, with an outwardly flared open mouth 6 which forms a pouring edge above the restricted neck.

In combination with this decanter or bowl I use a handle 7 made principally of a rigid material, preferably a molded plastic, such as those generally called phenolic condensation products. This handle embraces, or at least partially surrounds the restricted neck of the decanter at its smallest outside diameter. The handle in its preferred form, as shown in the drawing, includes two tapered arcuate arms 8 and 9 which I will call "cheliform" because of their resemblance to the chelae or pincers of a lobster. It will be noted that these arms are similar in size and shape and that when they are in assembled position they occupy substantially the same plane on opposite sides of the neck of the decanter.

At the base or juncture of the arms is a face 10 on arm 8 and a face 11 on arm 9; these faces opposing and touching each other when the arms are drawn together. On the face 10 is a lug 12 and on the face 11 is a complementary interlocking socket 13 which engages the lug for a purpose to be described later.

For the purpose of manipulating the handle, and consequently the decanter when the handle is applied thereto, I provide a hand grip 14 which is secured to the assembled arms, preferably as an integral part thereof. I have shown the hand grip as an extension of the arm 8, although it is obvious that the handle might be made as a part of either or both arms.

In order to draw the arms together around the neck of the bowl, I provide means such as a screw 15 and a nut 16 which pass through shouldered holes 17 and 18 in the bases of the arms 8 and 9 respectively. The enlarged part of the hole 18 may be made hexagonal, as indicated in Fig. 4, in order to accommodate the nut 16 while preventing its turning when the screw 15 is manipulated. The holes 17 and 18 preferably are located on the underside of the handle assembly so that they are not generally visible when the device is in use.

The screw and nut obviously draw the socket 13 and lug 12 together for interlocking the two arms together and preventing movement of the arms relative to each other out of their common plane. Other mutually interlocking formations between the arms may be provided, such as the tapered tongue 19 and its complementary groove 20.

The diameter of the circle generally defined by the inside of the cheliform arms 8 and 9 is made slightly larger than the largest expected neck diameter of the decanter with which the handle is to be used. In order to prevent slipping or wobbling of the handle on the bowl neck, as well as to accommodate variations in size of the neck, I use an isolated friction means of limited extent between the handle and the bowl. In the form shown, this friction means is a small resilient block or pad 21. Preferably, the material is natural or synthetic rubber, and the block is simply cut from a strip. This block is seated in and projects from a small recess formed in this instance by the two small similar recesses 22 and 23 which are in portions of the arms which are adjacent each other under the hand grip. This recess, and consequently the resilient block seated therein, faces in a direction toward the bulging bowl when the handle is secured in position. Because of this position of the friction block, when the handle assembly is tightened around the neck the block will frictionally engage a spot on the bowl, thereby preventing relative rotation between the bowl and the handle assembly, and lifting the handle assembly against the underside of the flared mouth. This will prevent wobbling of the handle with respect to the bowl when the bowl is lifted by the handle. The resiliency of the block furthermore provides a self adjustment between the handle and the neck of the bowl to compensate for minor manufacturing variations in the bowl neck.

Fig. 2 shows that the outer ends of the arms 8 and 9 do not meet, even when the adjacent faces of the arms are pulled together by the nut and screw. Therefore, the arms are discontinuous or incompletely surround the neck of the bowl. By leaving this gap between the outer ends of the arms, two functions are served; first, a handle assembly of a given size may accommodate satisfactorily a slightly wider range of variations in bowl neck sizes than would be the case if the arms completed a circle; and second, the gap will provide a clear path from the pouring edge of the mouth down the outside of the bowl, so that drippings from this edge will drain off and will not keep the handle assembly or the handle grip proper wet. This is so, because a portion of the neck is free from contact with the arms, where the arms are spaced apart.

Although I have shown the hand grip as extending from the handle assembly, at a point opposite the spaced apart ends of the arms, it is obvious that other angular locations between the hand grip and the ends of the arms might be preferred.

As will be evident from the foregoing description, certain aspects of my invention are not limited to the particular details of construction of the example illustrated, and I contemplate that various and other modifications and applications of the invention will occur to those skilled in the art. It is therefore my intention that the appended claims shall cover such modifications and applications as do not depart from the true spirit and scope of my invention.

What I claim as new and desire to secure by Letters Patent of the United States is:

1. A handle for a decanter of the type having a restricted neck portion extending from a bulging body, and an outwardly flared open mouth above the neck, said handle comprising a pair of similar coplanar rigid curved arms each tapering to a point at one end, with the other ends of the arms positioned adjacent each other, said arms adapted to embrace the restricted neck only partially, leaving a portion of the neck free from contact with the arms between the pointed ends thereof, each arm having an isolated recess of limited extent therein next to the adjacent arm, a single resilient block seated partly in each recess, said block projecting from said recess for frictional engagement with said decanter body, a hand grip extending from said arms above said block, and means for drawing and holding the adjacent portions of the arms together near the hand grip, said block biasing said handle away from said body and toward the underside of said flared mouth.

2. For use with a decanter having a bulging body and a neck portion of restricted circumference with an outwardly flared open mouth extending immediately above said body, that improvement in a handle which comprises an assembly of a pair of separate opposed coplanar arcuate tapered arms which together only partially surround the restricted circumference of the neck, a hand grip integral with and extending from said assembly, mutually interlocking formations on said arms preventing movement of the arms relative to each other out of their common plane, means for drawing the interlocking formations on the arms toward and against each other, said assembly having an isolated recess of limited extent opening downwardly and inwardly toward the bulging body, and a resilient pad seated in and projecting downwardly from said recess toward said body, frictionally engaging a spot on the bulging body and lifting the assembly against the outwardly flared mouth above said restricted neck.

3. For use with a recanter having a bulging body and a neck portion of restricted circumference with an outwardly flared open mouth extending immediately above said body, that improvement in a handle which comprises a pair of separate opposed arcuate arms encompassing a major portion of the restricted circumference of the neck, mutually interlocking formations on said arms preventing relative movement thereof, means for drawing said arms toward each other and said mutually interlocking formations into engagement, a hand grip extending from said pair of arms when assembled, means on said arms defining a recess of limited extent opening downwardly and inwardly toward the bulging decanter body, and a resilient pad seated in and projecting downwardly from said recess toward said body, frictionally engaging the bulging body and lifting said assembled pair of arms against the outwardly flared mouth above said restricted neck.

4. A handle structure for a decanter of the type having a bulging body and a neck portion of restricted diameter with an outwardly flared open mouth extending immediately above said neck portion, said handle structure comprising a pair of clamping arms each having a base portion and an arcuate portion to partially encircle the restricted decanter neck, interlocking formations on the base portions of said arms, means drawing said base portion together to engage said interlocking formations and to draw said arcuate arm portions towards each other into clamping relation around said decanter neck, a hand grip integral with an extending from said pair of clamping arms, means defining a recess of limited extent in the base portion of the assembled clamping arms, said recess opening downwardly and inwardly toward the bulging decanted body, and a resilient pad seated in and projecting from said recess to frictionally engage the bulging decanter body and lift the handle structure against the outwardly flared decanter mouth above the restricted neck.

EARLE C. SULLIVAN.

REFERENCES CITED

The following references are of record in the file of this patent:

UNITED STATES PATENTS

| Number | Name | Date |
| --- | --- | --- |
| 1,168,988 | Zimmermann | Jan. 18, 1916 |
| 1,859,614 | Boever | May 24, 1932 |
| 2,072,934 | Wolcott | Mar. 9, 1937 |
| 2,087,664 | Cory | July 20, 1937 |
| 2,137,884 | Weeks | Nov. 22, 1938 |
| 2,151,276 | Mattoon | Mar. 21, 1939 |
| 2,224,672 | Davis | Dec. 10, 1940 |